(12) United States Patent
Raichur et al.

(10) Patent No.: US 11,416,493 B2
(45) Date of Patent: Aug. 16, 2022

(54) SYSTEM AND METHOD FOR IMPLEMENTING A REPORTING ENGINE FRAMEWORK

(71) Applicant: JPMorgan Chase Bank, N.A., New York, NY (US)

(72) Inventors: Sreedhar Raichur, Uravakonda (IN); Zubair Ali Baig, Chennai (IN); Ullas Poojary, Mysore (IN); Kartheek Gopal, Bengaluru (IN); Yuvaraj Loganathan, Bengaluru (IN); Saheera Eranhikkal, Kerala (IN); Rudresh Kumar, Bengaluru (IN); Deepanker Sachdeva, Abohar (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 70 days.

(21) Appl. No.: 16/927,498

(22) Filed: Jul. 13, 2020

(65) Prior Publication Data

US 2021/0011915 A1 Jan. 14, 2021

Related U.S. Application Data

(60) Provisional application No. 62/873,540, filed on Jul. 12, 2019.

(51) Int. Cl.
*G06F 16/2455* (2019.01)
*G06F 16/22* (2019.01)
*G06F 9/54* (2006.01)
*G06F 16/242* (2019.01)
*G06F 16/248* (2019.01)

(52) U.S. Cl.
CPC ......... *G06F 16/24553* (2019.01); *G06F 9/54* (2013.01); *G06F 16/2282* (2019.01); *G06F 16/248* (2019.01); *G06F 16/2423* (2019.01)

(58) Field of Classification Search
None
See application file for complete search history.

(56) References Cited

U.S. PATENT DOCUMENTS

| | | | | |
|---|---|---|---|---|
| 10,635,634 | B2* | 4/2020 | Gokhale | G06F 16/9024 |
| 10,984,051 | B2* | 4/2021 | Sezgin | G06F 16/367 |
| 2015/0310075 | A1* | 10/2015 | Mescal | G06F 16/26 707/805 |
| 2018/0150533 | A1* | 5/2018 | Mathur | G06F 16/9535 |
| 2018/0165283 | A1* | 6/2018 | Rana | G06F 16/2228 |
| 2020/0125602 | A1* | 4/2020 | Sezgin | G06F 16/2228 |
| 2021/0011915 | A1* | 1/2021 | Raichur | G06F 16/2423 |
| 2021/0279287 | A1* | 9/2021 | Sezgin | G06F 16/367 |

* cited by examiner

*Primary Examiner* — Kim T Nguyen
(74) *Attorney, Agent, or Firm* — Greenblum & Bernstein, P.L.C.

(57) ABSTRACT

Embodiments disclosed herein provide for systems and methods of a reporting engine framework that dynamically generates a database query. The systems and methods provide for generating the database query via an intuitive user interface, wherein the user interface interacts with a plurality of application program interfaces to retrieve and generate data associated with the database to be queried.

20 Claims, 12 Drawing Sheets

| Generated Report 310 | | | | | | | | Export Results to a File 312 |
|---|---|---|---|---|---|---|---|---|

| General Report | Saved Report |
|---|---|

Select report • Report Type
ROUTE_DETAILS:VW | List Report

▽ Add Filter    Save    Generate    Reset All

▽ Generated Report

List Report ■                                                                    Export

| Request ID ▽ | State Name ▽ | Sender Name ▽ | Receiver Name ▽ | Sender Cost Center ▽ | Receiver Cost Center ▽ | Support Region ▽ | Assigned Eng. ▽ |
|---|---|---|---|---|---|---|---|
| 100001 | Decommissioned | Desktop User | W-Mart | 5xx000 | | APAC | |
| 100002 | Cancelled | Desktop User | W-Mart | 5xx000 | | APAC | Adam S |
| 100020 | Decommissioned | ACH AskChace | ACH-Acct Rec | 5xx000 | 5xx001 | APAC | Paul K |
| 100120 | Cancelled | Desktop User | Desktop User | 1xx000 | 1xx002 | APAC | Sam P |
| 100180 | Cancelled | J. Frame | Trans Rep | | 4xx090 | APAC | Brad M |
| 100323 | Decommissioned | W-Mart | Desktop User | | 4xx200 | APAC | Bob K |
| 100400 | Cancelled | Cognizant | Desktop User | | 1xx99 | APAC | Charlie M |

Current Page 1 of 60    First Previous 1 2 3 4 5 ... Next Last ■ Pagination: Items per page, Total results 314    Items per page 100

▽ Generated Report

| Tabular Chart | List Report | | | | |
|---|---|---|---|---|---|
| Support Region vs Sender Protocol | APAC | EMEA | NA | None | Total |
| AS2 | 14 | 8 | 108 | 0 | 202 |
| CONNECTDIRECT | 254 | 1017 | 19914 | 808 | 21993 |
| FTPS | 11 | 32 | 409 | 2 | 454 |
| HTTPS | 492 | 335 | 11867 | 4 | 12698 |
| SFTP | 3138 | 7241 | 35627 | 178 | 46184 |
| None | 233 | 335 | 2383 | 13 | 2964 |
| Total | 4142 | 8968 | 70380 | 1005 | 84495 |

810

▽ Generated Report

| Tabular Chart | List Report | | | | | | | Export |
|---|---|---|---|---|---|---|---|---|
| Request ID ▽ | State Name ▽ | Sender Name ▽ | Receiver Name ▽ | Sender Cost Center ▽ | Receiver Cost Center ▽ | Support Region Region ▽ | Assigned Eng ▽ | |
| 105490 | In Production | File Mover 1.0 | FIX | 4xxx70 | | APAC | Adam G | |
| 107910 | In Production | FileAct Transfer Gateway | SwiftBus | 4xxx1 | 4xx1 | APAC | Ashley V | |
| 108320 | In Production | Customer and Bank Data | ATS Rates Engine | 1xxx68 | 4xxx88 | APAC | Nick V | |
| 108709 | In Production | FileAct Transfer Gateway | SwiftBus | | | APAC | Ashley V | |
| 108830 | In Production | FileAct Transfer Gateway | SwiftBus | | | APAC | Ben H | |
| 116169 | In Production | CCAP-Mainframe Infrastr.. | Company 1 | 2xx388 | | APAC | Sam G | |
| 116227 | In Production | CCAP-Mainframe Infrastr.. | Company 1 | 2xx388 | | APAC | Steve P | |
| 118844 | Decommissioned | Asia Money Transfer System | Asia Money Trans | 4xxx26 | 4xxx26 | APAC | Nick V | |
| 120145 | In Production | DIP | Asia Money Trans | | 1xxx25 | APAC | Sam M | |
| 120649 | Decommissioned | Product System Interf (Asia) | Asia TS Shared | 4xxx26 | 4xxx26 | APAC | Sam M | |
| 120915 | Decommissioned | Product System Interf (Asia) | Asia TS Shared | 1xxx25 | 1xxx25 | APAC | Sam M | |
| 121117 | Decommissioned | Product System Interf (Asia) | Asia TS Shared | 1xxx25 | 1xxx25 | APAC | Sam M | |
| 121417 | Decommissioned | Asia Money Transfer System | Low Value Payment | 4xxx26 | 4xxx26 | APAC | Sam M | |

SYSTEM AND METHOD FOR IMPLEMENTING A REPORTING ENGINE FRAMEWORK

CROSS REFERENCE TO RELATED APPLICATIONS

The application claims priority to U.S. Provisional Application 62/873,540, filed Jul. 12, 2019, the contents of which are incorporated herein in its entirety.

FIELD OF THE INVENTION

The present invention relates generally to a reporting engine framework, and more particularly to a system and method for generating a dynamic database query.

BACKGROUND OF THE INVENTION

Entities, such as financial institutions, process huge amounts of data and then store this data in databases for further analysis. This data can be manually queried in order to generate meaningful reports. Common users of the data include database administrators (DBAs), business analysts as well as end users who want to analyze and interpret the data in order to make well-informed decisions. Generally, DBAs understand database architecture and have the skillset to write complex queries to generate reports. Business analysts, on the other hand, will use vendor products (e.g., IBM Cognos BI, SAP Crystal Reports, etc.) or an in-house developed solution to analyze the data. However, most general end users neither have the skills to generate a query nor the skills to effectively use vendor products to analyze the data.

Further, with current vendor products, there are obstacles and problems, such as upfront infrastructure costs, software licensing costs, complex initial setup (i.e., adjustments to the server setup are necessary before the service is up and running), steep learning curve for the end users, and vendor-dependence for enhancements, bug fixes, etc. Similarly, there are also problems associated with developing an in-house product which would require user experience and backend developers, huge effort in terms of time and cost (man hours spent), and continuous maintenance and support of the product.

These and other drawbacks exist.

SUMMARY OF THE INVENTION

According to an embodiment, the invention relates to a reporting engine framework that dynamically generates a database query. The method comprises the steps of: receiving, via a user-interface displayed to an end user, a selection of: (i) one of a database view or table, (ii) a filter from a plurality of filters associated with the selected database view or table, (iii) at least one operator from a plurality of operators associated with the selected filter, and (iv) one or more unique values associated with the selected filter; dynamically generating, via a computer processor, the database query based on the received selection, wherein: the plurality of filters are retrieved by a first application program interface (API) based on the selection of the database view or table, the plurality of operators are generated by a second API based on the selection of the filter, and the unique values are retrieved by a third API based on the selection of the filter; applying the database query to one or more databases; and generating, via the user-interface, an output responsive to the database query.

According to an embodiment, the invention relates to a system that implements a reporting engine framework that dynamically generates a database query. The system comprises: one or more databases; a user interface that receives inputs from an end user; and a computer processor coupled to the one or more databases and the user interface and configured to perform the steps of: receiving, via the user-interface displayed to an end user, a selection of: (i) one of a database view or table, (ii) a filter from a plurality of filters associated with the selected database view or table, (iii) at least one operator from a plurality of operators associated with the selected filter, and (iv) one or more unique values associated with the selected filter; dynamically generating, via a computer processor, the database query based on the received selection, wherein: the plurality of filters are retrieved by a first application program interface (API) based on the selection of the database view or table, the plurality of operators are generated by a second API based on the selection of the filter, and the unique values are retrieved by a third API based on the selection of the filter; applying the database query to the one or more databases; and generating, via the user-interface, an output responsive to the database query.

According to an embodiment of the present invention, the reporting engine framework may be vendor agnostic and further deployed as a web service framework (e.g., software as a service (SaaS)) on any web server, and is also bind-able to any cloud service platform (e.g., GAIA, Amazon Web Services (AWS), etc.). SaaS may be easily consumed by any end-user device, resulting in substantial savings in terms of developer man hours. Further, by being a one-click bind-able service, an embodiment of the present invention may be deployed to market much faster. In addition, the reporting engine framework may have no or minimal dependencies on vendor products, thereby resulting in savings in terms of licensing and underlying infrastructure costs. Further, the reporting engine framework may also provide additional advantages, such as (i) basic initial set up, (ii) no requirement of prior structured query language (SQL) knowledge, (iii) no requirement of understanding of table architecture, (iv) and an intuitive user interface (e.g., easy to learn and use).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE INVENTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to systems and methods for implementing a reporting engine framework that dynamically generates a database query based on end user inputs. The systems and methods provide for generating the database query via an intuitive user interface, wherein the user interface may interact with a plurality of application programming interfaces (APIs) to retrieve and generate data associated with the database to be queried. An embodiment of the present invention is directed to a framework that eliminates the need for end users to know or understand database architectures and further abstracts the end users from complex table joins and SQL statements. The innovative framework provides user friendly UIs, APIs and algorithms that facilitate orchestration and generation of various different types of reports and outputs. With an embodiment of the present invention, a plug and play framework may be realized for data visualization and data analysis through drill down charts and other output formats.

With an embodiment of the present invention, the innovative framework may be used to generate queries against various databases, including relational and non-relational databases and other database structures. An embodiment of the present invention may further schedule report generation to run at specific times or intervals. For example, a user may communicate the report (via email attachment or other electronic communication) at a scheduled time or interval to a set of recipients. An embodiment of the present invention may support various outputs, including data visualization charts (e.g., bar, tabular, pie, etc.).

Figure 1:
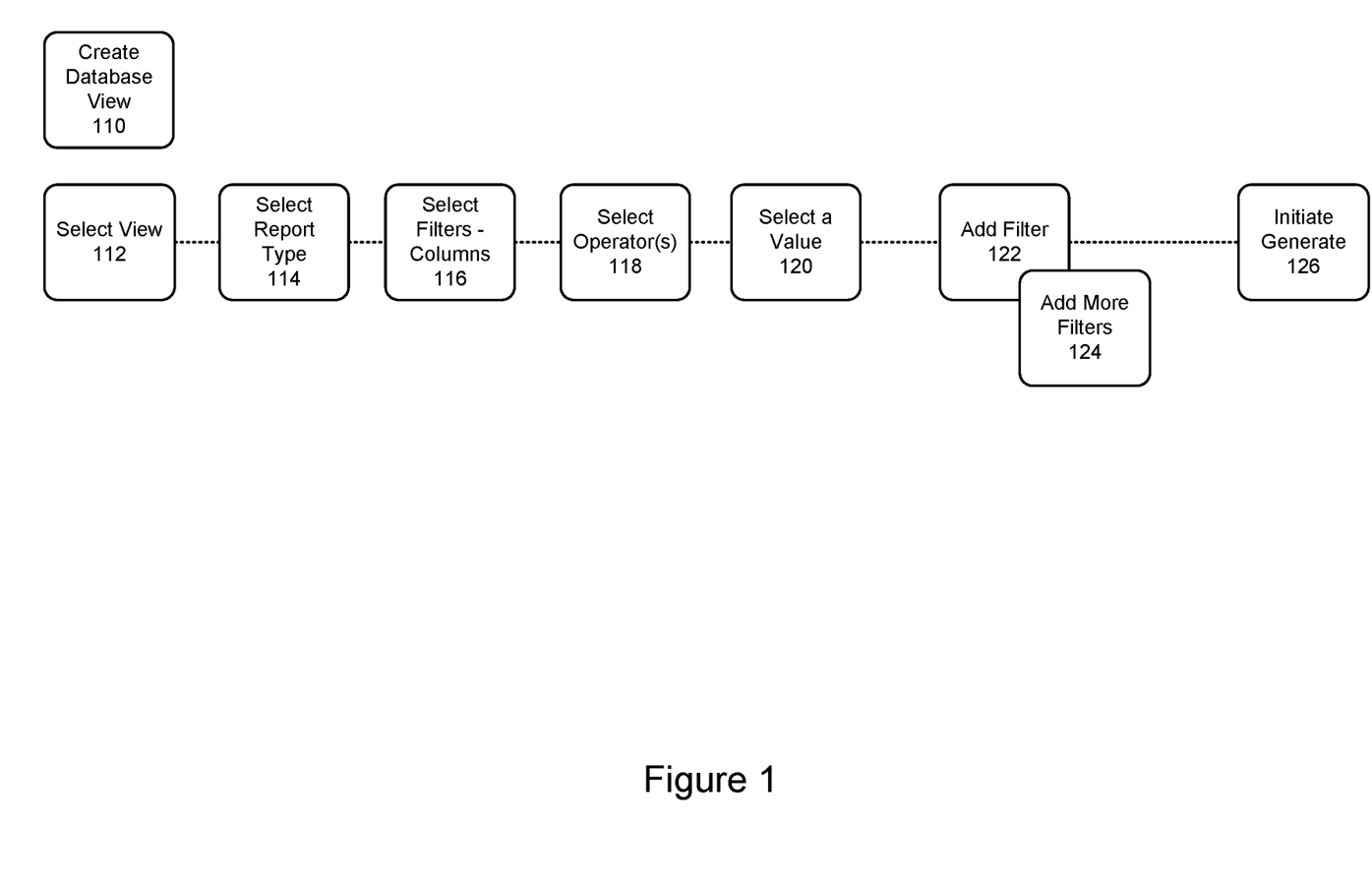
FIG. 1 illustrates a process flow for generating a dynamic list report using a user interface, according to an exemplary embodiment of the present invention.

FIG. 1 illustrates a process flow for generating a dynamic list report using a user interface, according to an exemplary embodiment of the present invention. At step 110, database view creation may be initiated. At step 112, a database view may be selected. At step 114, a report type (e.g., "List Report" or "Tabular Chart") may be selected. At step 116, column filters may be identified in the selected database view. At step 118, one or more operators associated with the selected column filter may be identified. At step 120, values for the filter may be selected. As shown by step 122 and 124, additional filters may be applied. At step 126, a report may be generated based on the created query. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Figure 2:
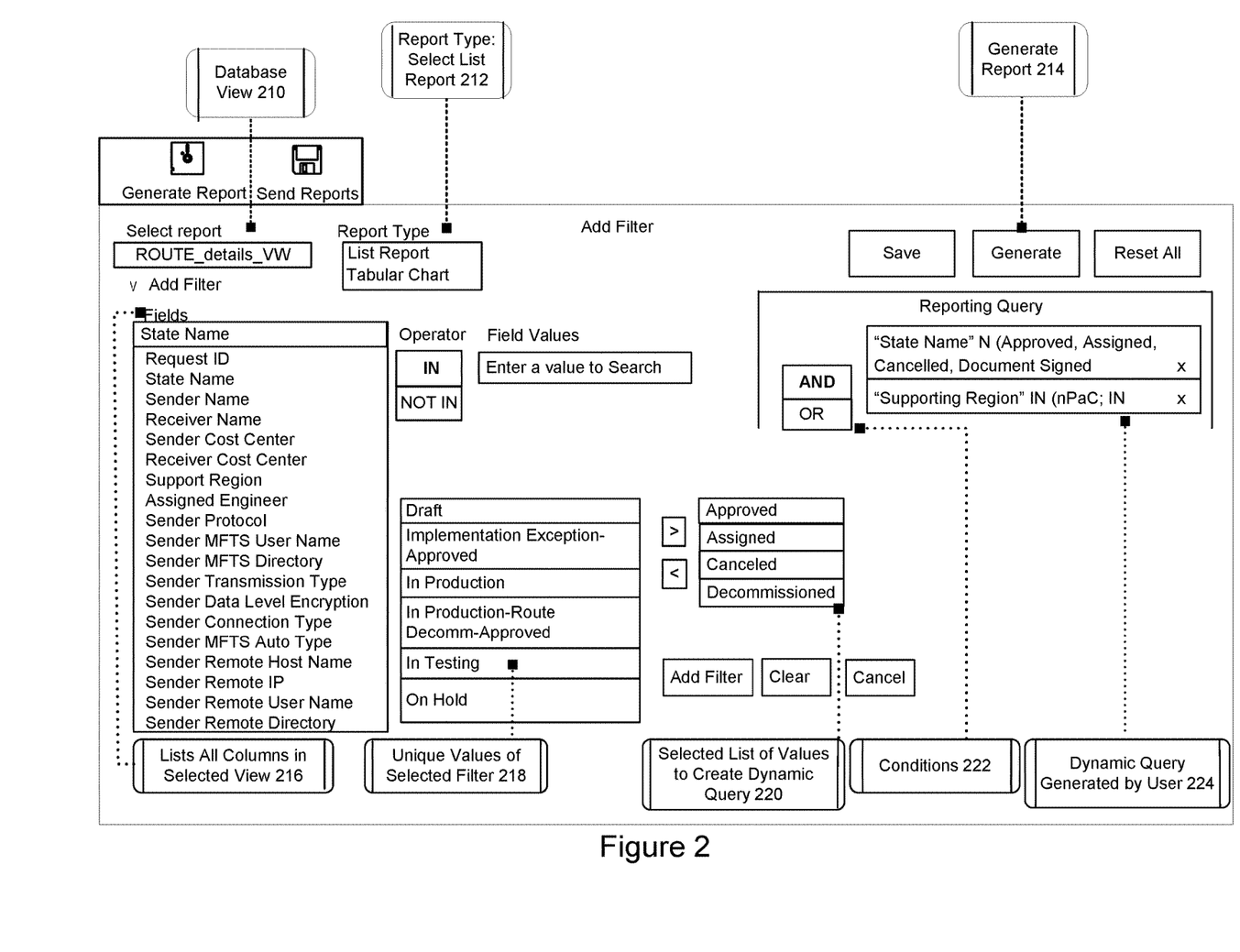
FIG. 2 is an exemplary user interface, according to an exemplary embodiment of the present invention.

FIG. 2 is an exemplary user interface, according to an exemplary embodiment of the present invention. As shown in FIG. 2, to select a particular database view, the database view may be first created. For example, the database view may be a joining of a variety of tables in a database. Once the database view is created, an end user may select the particular database view in the drop down menu associated with the "Select report" of the user interface. For example, as shown in FIG. 2, the "ROUTE DETAILS VW" database is selected at 210. After the selection of the database view, a first application program interface (API) may fetch the columns associated with the database view and populate the "Fields" drop down menu in the user interface at 216. After which, the end user may select the type of report to generate, e.g., "List Report" or "Tabular Chart" at 212. Then, the end user may select one of the columns in the "Fields" list to use as a filter at 216. In this example, a second API may dynamically generate operators based on the selected column filter. For example, assuming the selected filter is "State Name," the second API generates operators "IN" and "NOT IN" as depicted in FIG. 2. The operators facilitate the building of a query. In particular, because operators may be auto-populated and may be based on the type of column selected, end users do not need to know the particular table architecture of the column type. For example, if a user selects a date/time column/filter (e.g., "Submit Date"), then the possible operators may be: "<" (less than), ">" (greater than), "=" (equals), and "!=" (not equal to). Similarly, if a number column/filter (e.g., "No. of Requests") is selected, then the possible operators can be: "<" (less than), ">" (greater than), and "=" (equals). Further, if a Boolean column/filter is selected, then the possible operators may be: "True" and "False."

In addition, a third API may fetch unique values associated with the selected column filter, as shown by 216. For example, the following unique values may be associated with the filter "State Name": (i) "Draft," (ii) "Implementation—Exception—Approved," "In Production," "In Production—Route Decomm—Approved," "In Testing," "On Hold," "Approved," "Assigned," "Cancelled," and "Decommissioned." The end user may then select which unique values to include in order to create a new query. For example, "Approved," "Assigned," "Cancelled," and "Decommissioned" may be selected to include in the new query, as shown by 220.

According to an exemplary embodiment, the new query may be generated by selecting the "Add Filter" button in the user interface. In particular, the new query may be dynamically generated using a query-generating algorithm based on the selected filters, operators, and/or conditions. For example, the user interface may provide the selected view, filters, operators, and/or conditions to the query-generating algorithm. Then, the query-generating algorithm may validate the user interface inputs (e.g., selected view, filters, operators, conditions, etc.) to confirm that there are no DLL statements such as ALTER, CREATE, DROP and DELETE. The query-generating algorithm may then collate the selected filter and corresponding operators to generate a valid query state. Further, the query-generating algorithm may construct a SELECT query by adding aliases for the columns in the VIEW and WHERE clauses so that the response may include user-friendly column names (which match the original filter names, for example). Further, according to an embodiment of the present invention, the query-generating algorithm may be dynamic where it is not specific to any particular view or database and, therefore, may be used against any view or database, as shown by 224. Once the new query is created, it may be displayed in a "Reporting Query" section of the user interface.

Further, as depicted in FIG. 2, a number of separate queries may be combined to generate a list report. For example, the separate queries may be combined via an "AND/OR" conditional logical statement with a corresponding drop down menu at 222. Then, based on the selected queries, a corresponding list report may be generated (e.g., by selecting the "Generate" button) at 214. Further, this may be enhanced by adding different types of brackets (e.g., "( )", "(( ))," etc.) so that multiple filters may be grouped together, thereby facilitating the creation of complex queries with multiple "AND/OR" conditional logical statements, as shown by 224.

Figure 3:
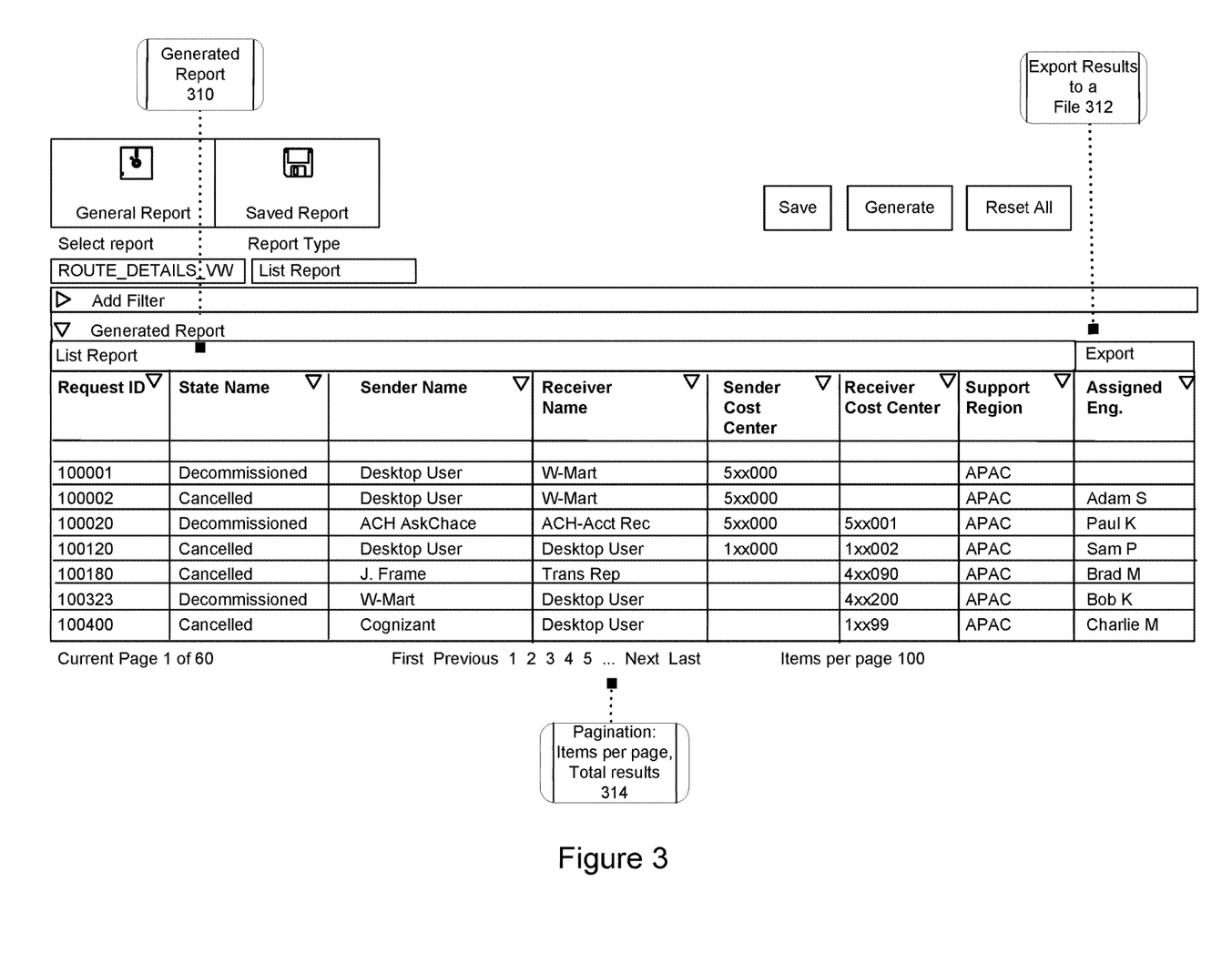
FIG. 3 illustrates a generated list report, according to an exemplary embodiment of the present invention.

FIG. 3 illustrates a generated list report, according to an exemplary embodiment of the present invention. As depicted in FIG. 3, the generated list report (at 310) may include a list of values associated with the filter names and values selected with the user interface in FIG. 2. According to an embodiment of the present invention, the end user may also export the results of the search to another format, e.g., Excel, PDF, CSV, etc. In particular, the generated report may be extracted by selecting the "Export" button in the user interface at 312. Further, the user may also select the number of items to export. Total results may be shown at 314.

Figure 4:
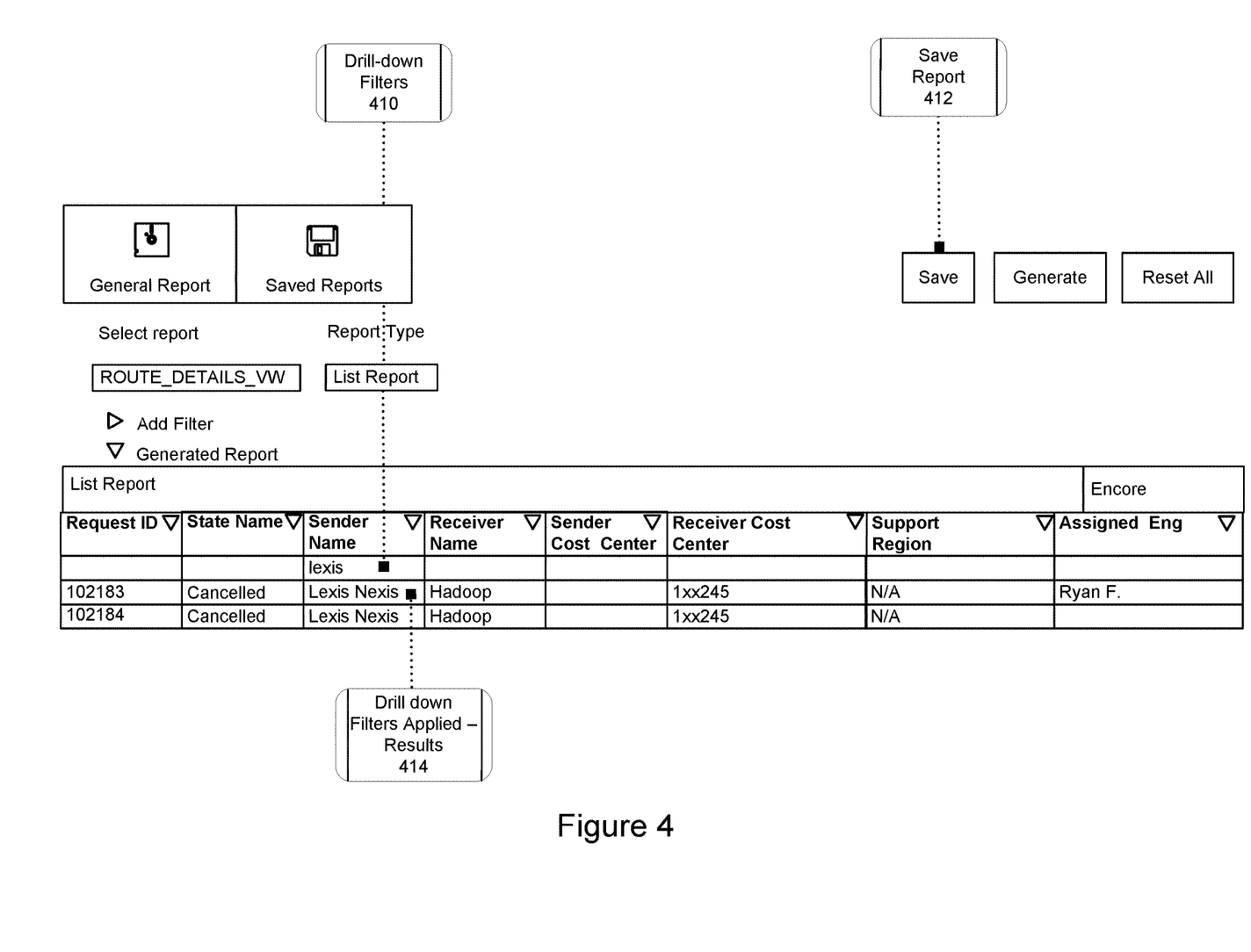
FIG. 4 illustrates additional filters associated with the user interface, according to an exemplary embodiment of the present invention.

FIG. 4 illustrates additional filters associated with the user interface, according to an exemplary embodiment of the present invention. According to an exemplary embodiment, advanced filtering may be performed for each column in the list report. In particular, each column heading (e.g., "Request ID," "State Name," "Sender Name," "Receiver Name," "Sender Cost Center," "Support Region," "Assigned Engineer," etc.) may include an associated search field located underneath it. As such, by inputting a particular search into the search field, the end user may automatically condense the list report and review those search results that match the particular search. For example, if the end user enters "Lexis" into the search field underneath the "Sender Name" heading at 414, the list report displays those search results where the "Sender Name" is "Lexis" at 410. According to an embodiment of the present invention, the end user may then save the query for later use at 412. For example, the query may be saved against the end user's profile.

Figure 5:
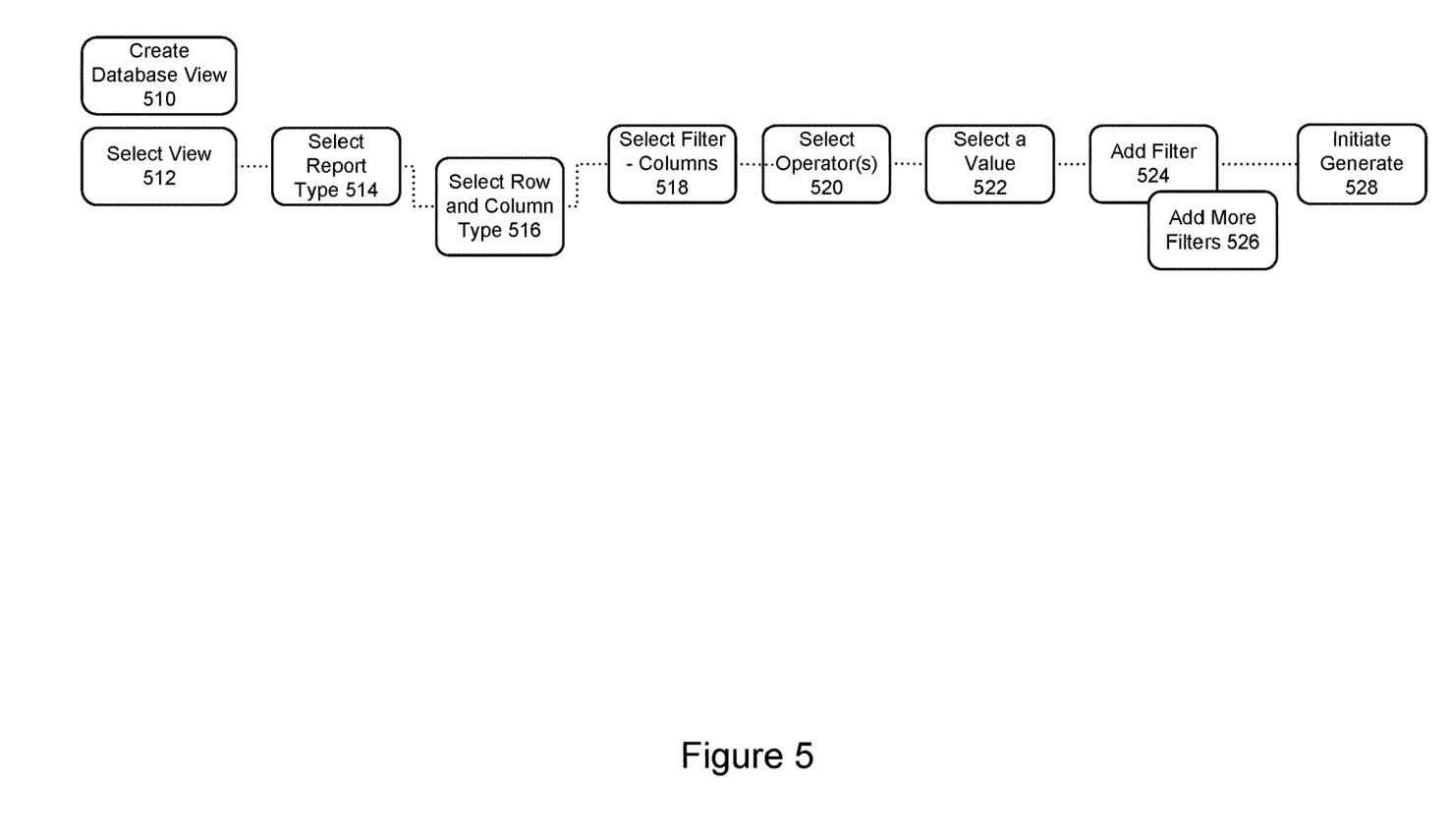
FIG. 5 illustrates a process flow for generating a tabular report using a user interface, according to an exemplary embodiment of the present invention.

FIG. 5 illustrates a process flow for generating a tabular report using a user interface, according to an exemplary embodiment of the present invention. At step 510, database view creation may be initiated. At step 512, a database view may be selected. At step 514, a report type (such as Tabular) may be selected. At step 516, row and column type may be selected. At step 518, column filters may be identified in the selected database view. At step 520, an operator associated with the selected column filter may be selected. At step 522, values for the filter may be selected. As shown by steps 524 and 526, additional filters may be added. At step 528, a report may be generated based on the created query. While the process of FIG. 5 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Figure 6:
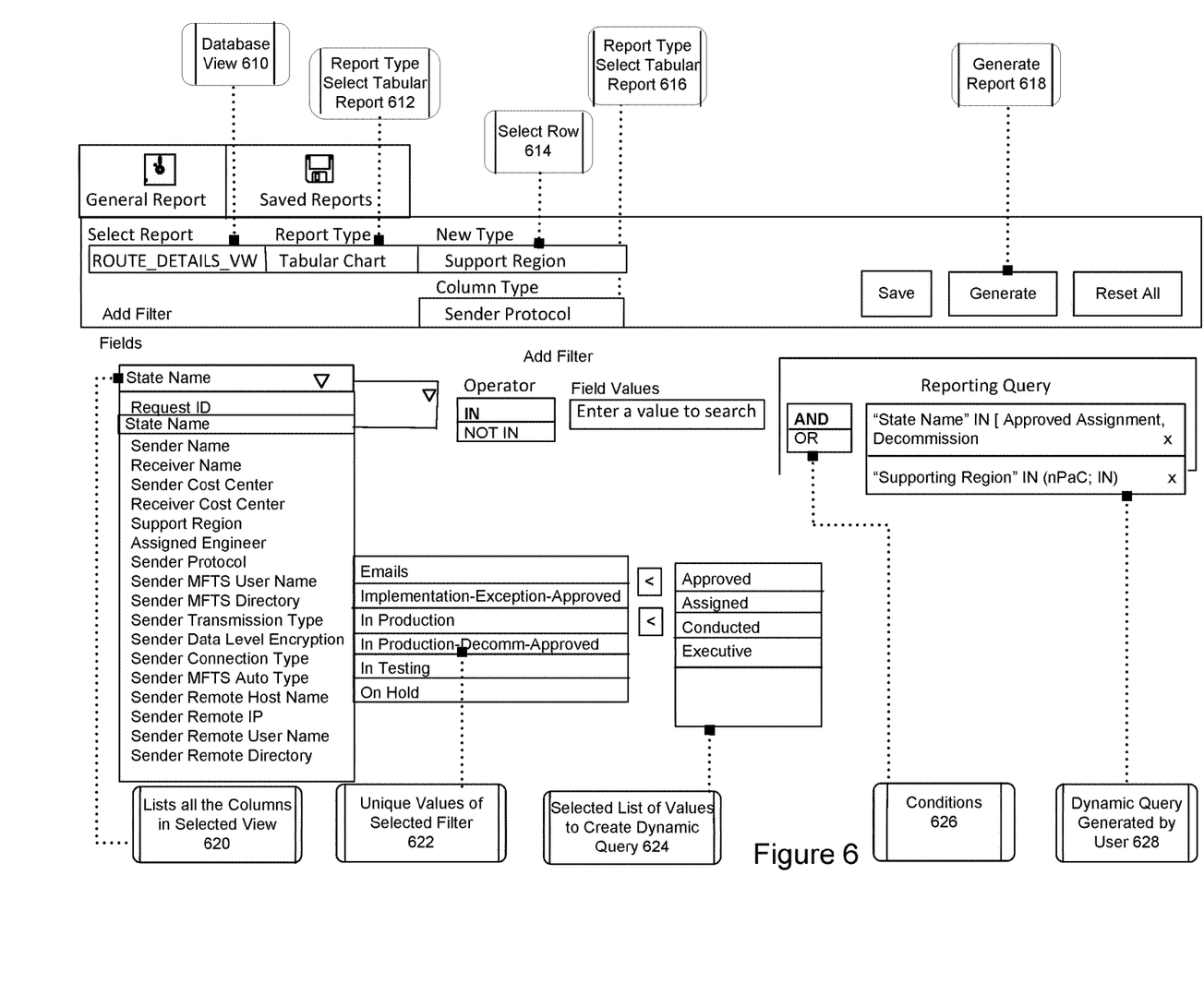
FIG. 6 is an exemplary user interface, according to an exemplary embodiment of the present invention.

FIG. 6 is an exemplary user interface, according to an exemplary embodiment of the present invention. Database view 610 may show a selected report. In the example of FIG. 6, because the "Tabular Report" is chosen at 612, the end user may select a row type at 614 and a column type at 616 for the tabular report. According to an embodiment of the present invention, the row type and column type may be selected from the fields associated with selected database view. For example, the end user may select "Support Region" for the row type at 614 and "Sender Protocol" for the column type at 616. As such, the tabular report may be utilized as bird's eye view of the information presented in the list report.

FIG. 6 further illustrates an Add Filter feature. Here, the available fields may be displayed. For example, 620 may list all the columns in the selected view. Unique values of the selected filter may be shown at 622. In addition, 624 may provide a selected list of values to create a dynamic query. Reporting Query may include conditions 626 that may be used to generate a dynamic query at 628.

Figure 7:
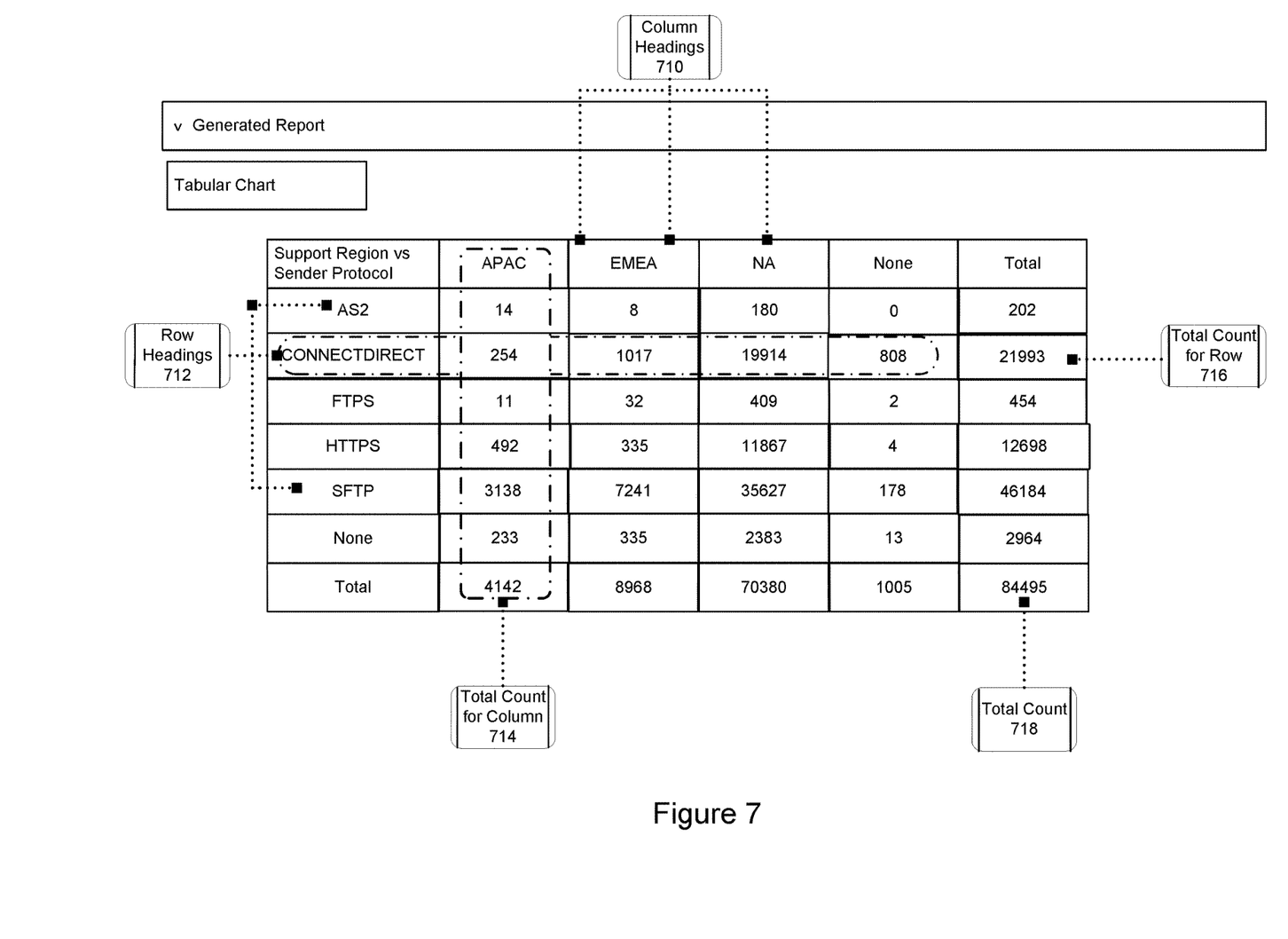
FIG. 7 illustrates a generated tabular report, according to an exemplary embodiment of the present invention.

FIG. 7 illustrates a generated tabular report, according to an exemplary embodiment of the present invention. As shown in FIG. 7, the generated tabular report may compare a variety of support regions (e.g., APAC, EMEA, NA, None) to a variety of sender protocols (e.g., AS2, CONNECTDIRECT, FTPS, HTTPS, SFTP, None). The cell values may correspond to a number of data entries associated with the particular support region (e.g., APAC) and sender protocol (e.g., CONNECTDIRECT). In this example, support regions may be represented as column headings at 710 and sender protocols may be represented as row headings at 712. A total count for a column may be shown at 714 while a total count for a row is shown at 716. A total count for the visualization may be provided at 718.

Figure 8:
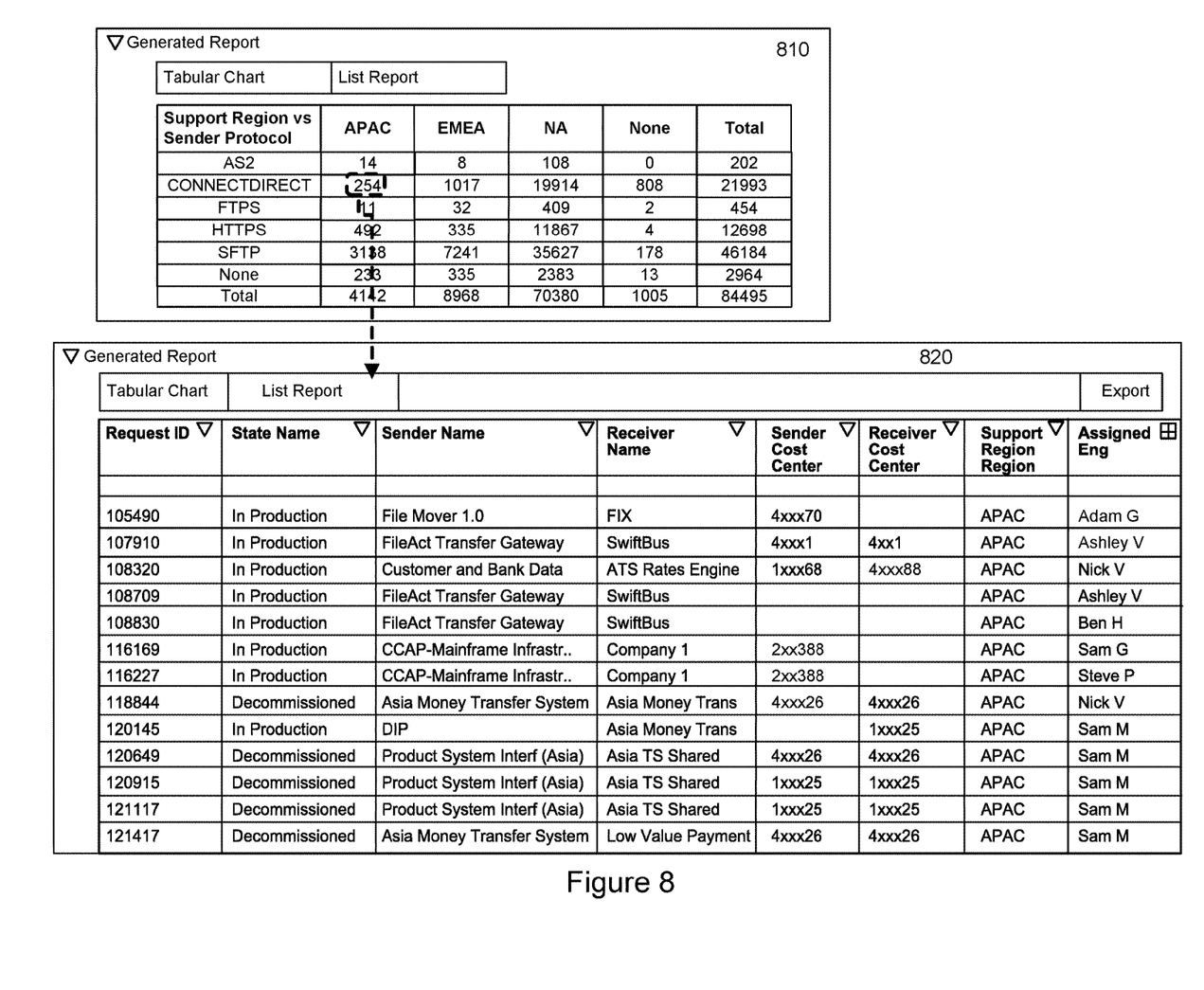
FIG. 8 illustrates additional features associated with the user interface, according to an exemplary embodiment of the present invention.

FIG. 8 illustrates additional features associated with the user interface, according to an exemplary embodiment of the present invention. Generated Reports may be displayed at 810. According to an embodiment of the present invention, additional drill down features may be performed by selecting (e.g., by clicking) on any of the cells. For example, by selecting the cell at the intersection of APAC and CONNECTDIRECT, a list report may be generated including each of the data entries associated with that cell. In particular, the selection of a particular cell may generate an additional query that corresponds to the particular row and column associated with that cell. For example, the cell that is displayed as having 254 data entries may be selected as shown by the dotted box, a query including sender protocol=CONNECTDIRECT and support region=APAC may be generated and implemented, as shown by 820.

Figure 9:
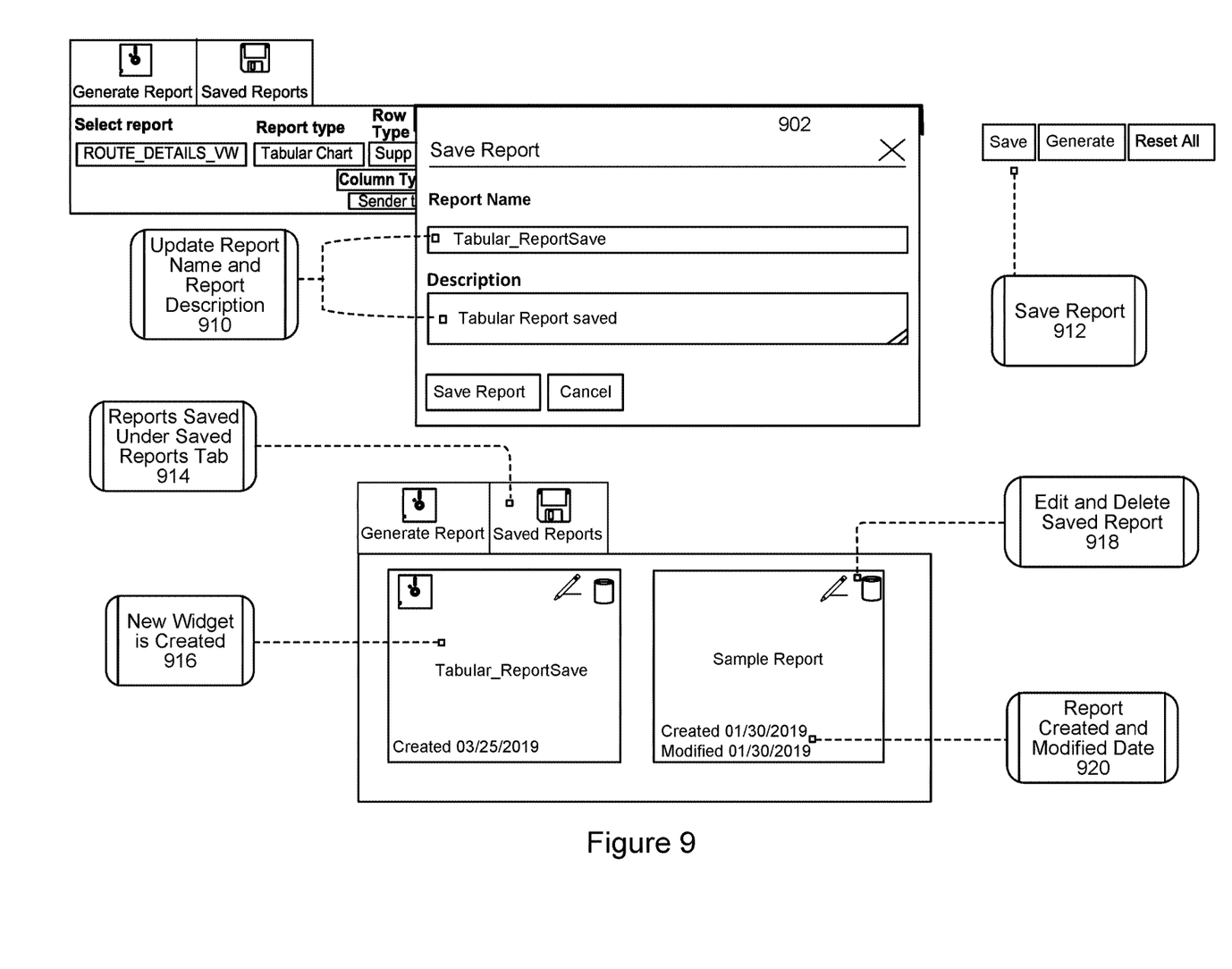
FIG. 9 illustrates a process flow for saving a report using a user interface, according to an exemplary embodiment of the present invention.

FIG. 9 illustrates a process flow for saving a report using a user interface, according to an exemplary embodiment of the present invention. According to an embodiment of the present invention, to save a particular report, an end user may select the "Save" button at 912 associated with the user interface. In response to the selection of the "Save" button, a dialog box may be presented to the end user as shown by 902. In the dialog box, the end user may enter a report name as well as a description of the report at 910. After the report is saved (e.g., by selecting the "Save Report" button in the dialog box at 914), a widget associated with the report may be created and saved under a "Saved Reports" tab as illustrated by 916. According to an exemplary embodiment, the widget may include functionality allowing the end user to edit and/or delete a save report at 918 as well as display the report's date of creation and date of last modification at 920.

Figure 10:
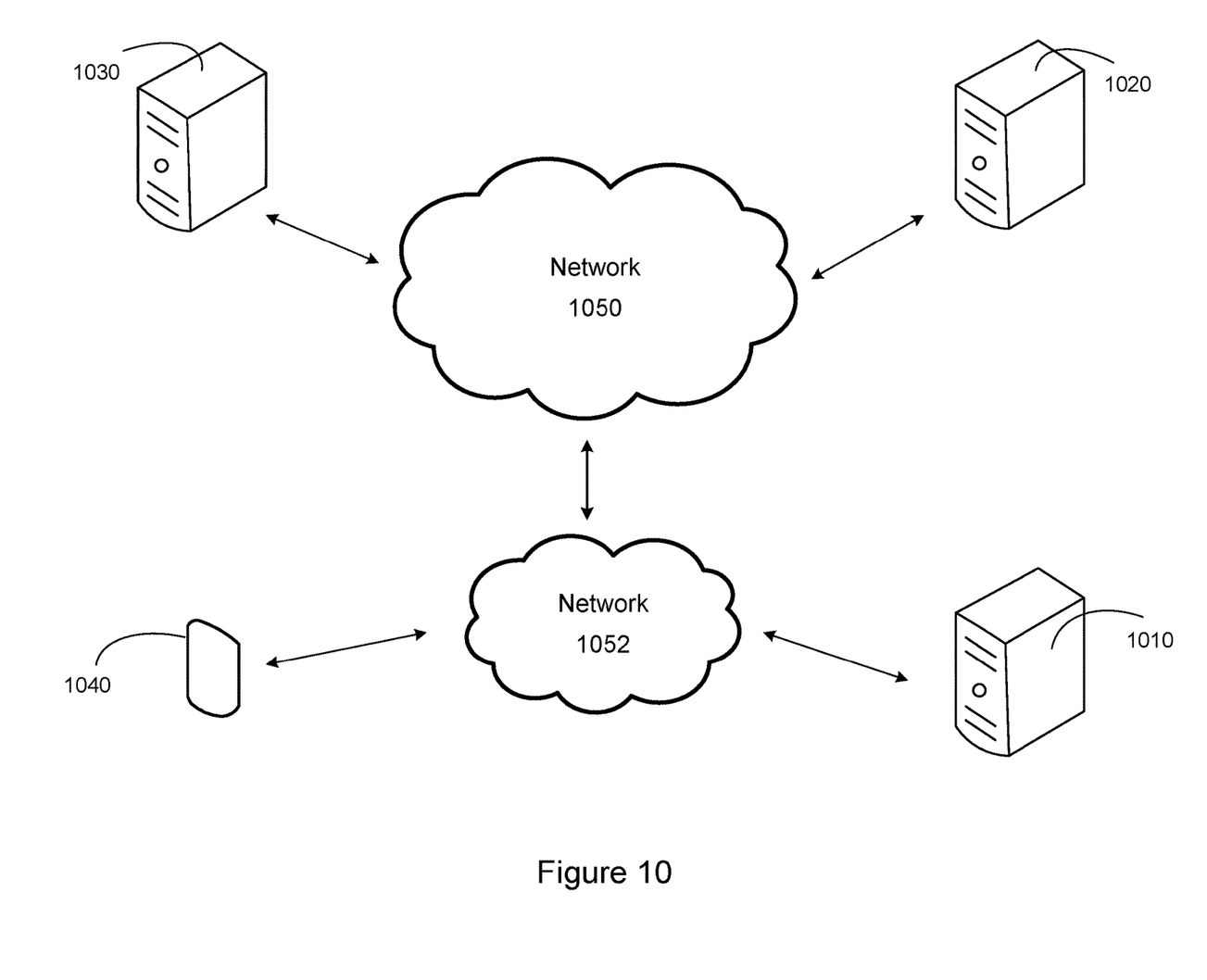
FIG. 10 illustrates a system implementing a reporting engine framework, according to an exemplary embodiment of the present invention.

FIG. 10 illustrates a system implementing a reporting engine framework, according to an exemplary embodiment of the present invention. As shown in FIG. 10, the system may include one or more computing devices, such as servers 1010, 1020, 1030, and personal computing device 1040. The system may also include one or more networks 1050, 1052 that connect the various computing devices shown in FIG. 10. Although only one personal computing device 1040 and three servers 1010, 1020, 1030 are shown in FIG. 10 to illustrate principles of the invention, in practice additional devices and servers may be involved in implementation of various embodiments of the invention. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

The system implementing the reporting engine framework may be embodied primarily in a server 1010, which executes the methods described above for generating queries and corresponding reports. The system may also include, or interface with, servers 1020 and 1030 that store and provide data that is input to the server 1010. The system may be accessed and controlled by a personal computing device 1040 which may comprise a mobile phone, tablet computer, laptop computer, or desktop computer, for example. For example, the user interface described in FIGS. 1 to 9 may be implemented and displayed in the personal computing device 1040. Further, according to an embodiment, each of the first, second, and third APIs may be triggered by the personal computing device 1040. In particular, the first, second, and third APIs may be configured to retrieve data associated with a relational database in at least one of servers 1010, 1020, and 1030. In another embodiment, the first, second, and third APIs may be configured to retrieve data associated with a non-relational database in at least one of servers 1010, 1020, and 1030. In this regard, the first API may be configured to retrieve tables from the non-relational databases instead of views of the database(s) (as is the case for relational databases).

Figure 11:
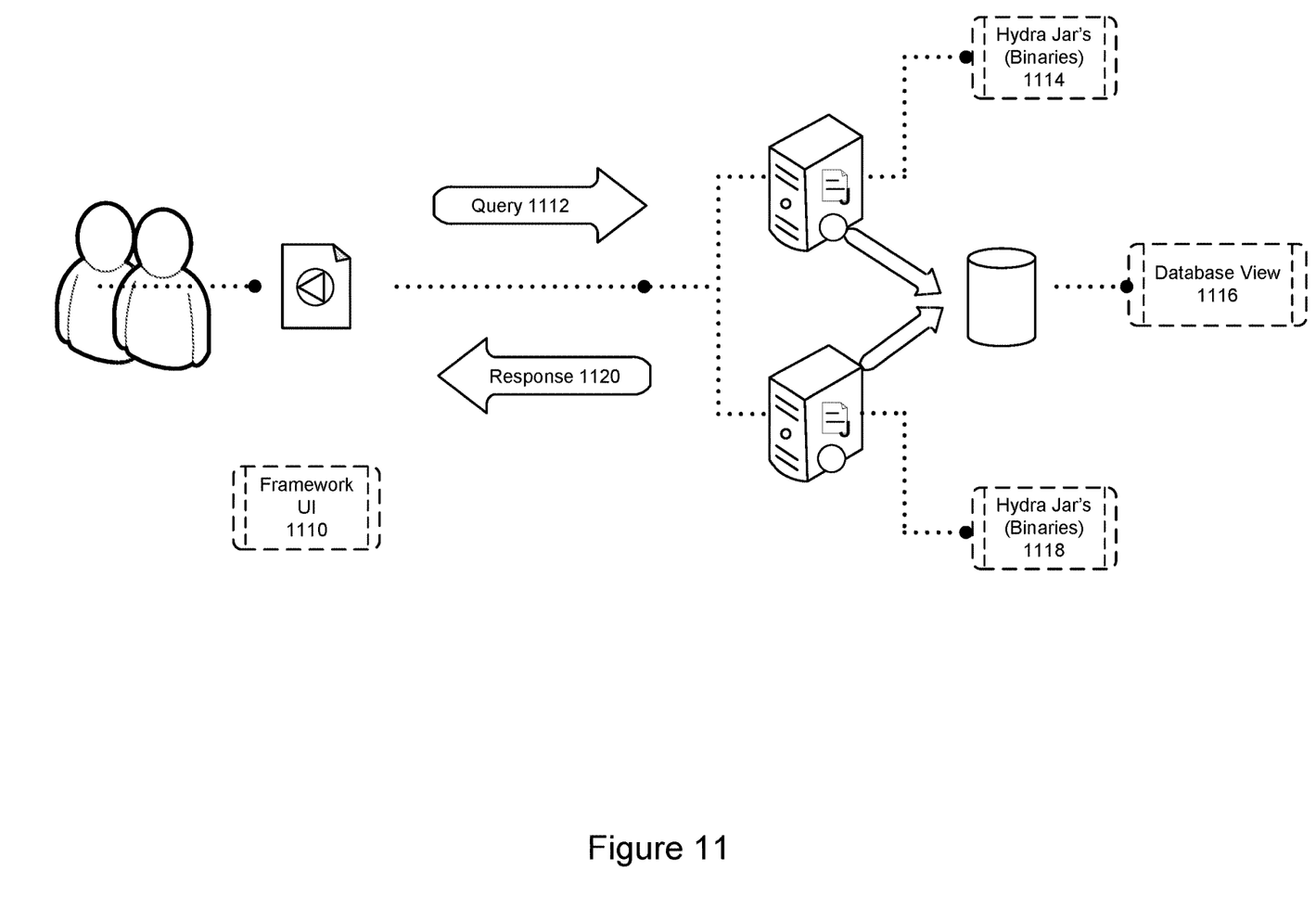
FIG. 11 illustrates a stand-alone implementation of the reporting engine framework, according to an exemplary embodiment of the present invention.

FIG. 11 illustrates a stand-alone implementation of the reporting engine framework, according to an exemplary embodiment of the present invention. As depicted in FIG. 11, a database view may be created by joining the necessary tables from a plurality of web servers. Further, a framework binary (e.g., Java Archive or JAR) may be deployed on the web servers, as shown by 1114 and 1118. Further, configuration files associated with each of the web servers may be updated so that the web servers can communicate with the database view 1116. According to an embodiment of the present invention, an end user may access the UI shown by 1110 to generate reports by performing various actions, including: (i) selecting the filters, (ii) selecting the operators based on the filter, (iii) adding the filters, and/or (iv) generating the query for the report, as shown by Query 1112 and Response 1120.

Figure 12:
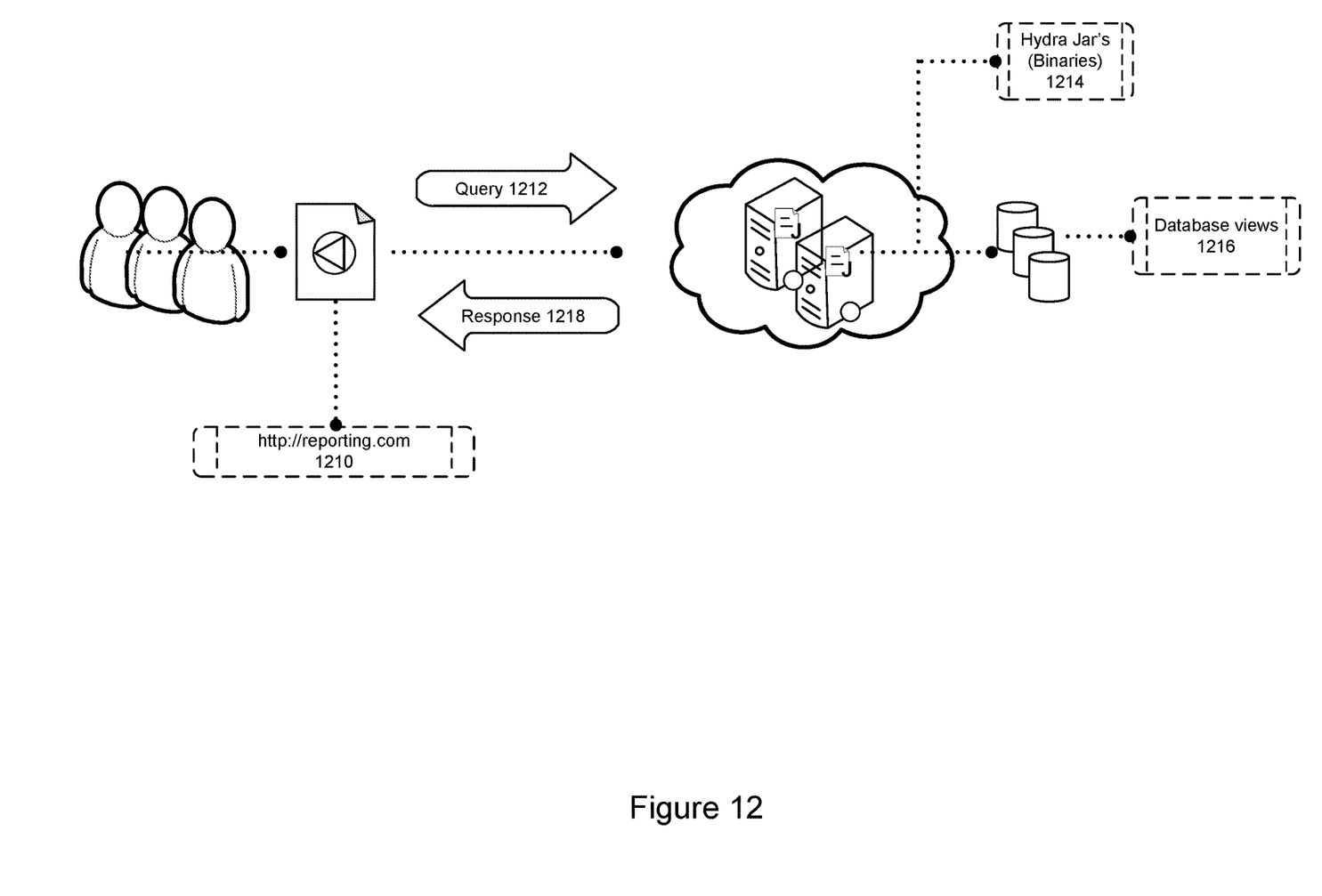
FIG. 12 illustrates a SaaS (or cloud-based) implementation of the reporting engine framework, according to an exemplary embodiment of the present invention.

FIG. 12 illustrates a SaaS (or cloud-based) implementation of the reporting engine framework, according to an exemplary embodiment of the present invention. As depicted in the figure, a database view 1216 may be created by joining the necessary tables from a plurality of web servers in the cloud platform. Further, a framework binary (e.g., Java Archive or JAR) may be deployed on the web servers in the cloud platform at 1214. Further, configuration files may be exposed as service/configurations for DB connections. According to an embodiment of the present invention, respective application owners may manage their DB connections and configuration files. Further, an end user may access the UI (shown by 1210) to generate reports by performing various actions, including: (i) selecting the filters, (ii) selecting the operators based on the filter, (iii) adding the filters, and (iv) generating the query for the report, as shown by Query 1212 and Response 1218.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for generating a database query, the method comprising the steps of:
    creating, via a computer processor, an overall database view by joining a plurality of tables in a database;
    presenting, via a user-interface displayed to an end user, a plurality of choices for a specific database view from the overall database view in a drop-down menu;
    receiving, via the user-interface, a user selection of one of the plurality of choices for the specific database view from the overall database view in a drop-down menu;
    populating, in the user-interface, a plurality of fields representing columns associated with the user selected specific database view;
    receiving, via a user-interface displayed to an end user, a selection of: (i) a report type comprising one of a database view or table, (ii) one of the columns from the plurality of fields that serves as a filter, (iii) at least one operator from a plurality of operators associated with the selected filter, and (iv) one or more unique values associated with the selected filter;
    dynamically generating, via a computer processor, the database query based on the received selection, wherein: the plurality of filters are retrieved by a first application program interface (API) based on the selection of the database view or table, the plurality of operators are generated by a second API based on the selection of the filter, and the unique values are retrieved by a third API based on the selection of the filter;
    applying the database query to one or more databases; and
    generating, via the user-interface, an output responsive to the database query.

2. The method of claim 1, wherein the database query is applied to a relational database.

3. The method of claim 1, wherein the database query is applied to a non-relational database.

4. The method of claim 1, wherein the output comprises data visualization and data analytics.

5. The method of claim 1, wherein the output comprises one or more graphical charts.

6. The method of claim 1, wherein the output is generated based on a predetermined schedule.

7. The method of claim 1, wherein the output is automatically transmitted to one or more predetermined recipients.

8. The method of claim 1, wherein the output comprises multiple different formats.

9. The method of claim 1, wherein user input does not involve SQL statements.

10. The method of claim 1, wherein the output provides further analysis through drill-down charts.

11. A computer-implemented system for generating a database query, the system comprising:
    one or more databases;
    a user interface that receives inputs from an end user; and
    a computer processor coupled to the one or more databases and the user interface and configured to perform the steps of:
        creating, via the computer processor, an overall database view by joining a plurality of tables in a database;
        presenting, via the user-interface, a plurality of choices for a specific database view from the overall database view in a drop-down menu;
        receiving, via the user-interface, a user selection of one of the plurality of choices for the specific database view from the overall database view in a drop-down menu;
        populating, in the user-interface, a plurality of fields representing columns associated with the user selected specific database view;
        receiving, via the user-interface displayed to an end user, a selection of: (i) a report type comprising one of a database view or table, (ii) one of the columns from the plurality of fields that serves as a filter, (iii) at least one operator from a plurality of operators associated with the selected filter, and (iv) one or more unique values associated with the selected filter;
        dynamically generating, via the computer processor, the database query based on the received selection, wherein: the plurality of filters are retrieved by a first application program interface (API) based on the selection of the database view or table, the plurality of operators are generated by a second API based on the selection of the filter, and the unique values are retrieved by a third API based on the selection of the filter;

applying the database query to the one or more databases; and generating, via the user-interface, an output responsive to the database query.

12. The system of claim 11, wherein the database query is applied to a relational database.

13. The system of claim 11, wherein the database query is applied to a non-relational database.

14. The system of claim 11, wherein the output comprises data visualization and data analytics.

15. The system of claim 11, wherein the output comprises one or more graphical charts.

16. The system of claim 11, wherein the output is generated based on a predetermined schedule.

17. The system of claim 11, wherein the output is automatically transmitted to one or more predetermined recipients.

18. The system of claim 11, wherein the output comprises multiple different formats.

19. The system of claim 11, wherein user input does not involve SQL statements.

20. The system of claim 11, wherein the output provides further analysis through drill-down charts.

* * * * *